United States Patent [19]
Cohen et al.

[11] Patent Number: 5,462,077
[45] Date of Patent: Oct. 31, 1995

[54] APPARATUS AND METHOD FOR SHUTTING OFF FLUID FLOW IN A PIPE MAIN

[75] Inventors: John H. Cohen; Curtis E. Leitko; Gerard T. Pittard; Terry P. Clifton, all of Houston, Tex.; Gerald Rockower, Brooklyn, N.Y.

[73] Assignees: Brooklyn Union Gas Co., Brooklyn; Consolidated Edison Company of New York, Inc., New York, both of N.Y.; a part interest

[21] Appl. No.: 221,891

[22] Filed: Mar. 31, 1994

[51] Int. Cl.$^6$ .......................... F16K 43/00; F16L 55/124
[52] U.S. Cl. .............................. 137/15; 137/318; 138/93; 138/94; 138/97; 405/154; 405/282
[58] Field of Search .............................. 137/15, 315, 317, 137/318; 138/93, 94, 97; 277/227, 228, 235 R; 405/154, 282, 283

[56] References Cited

U.S. PATENT DOCUMENTS

| | | | |
|---|---|---|---|
| 2,995,335 | 8/1961 | Raftis | 251/5 |
| 3,362,168 | 1/1968 | Dotlich | 405/283 |
| 3,773,067 | 11/1973 | Ray | 137/318 |
| 3,788,086 | 1/1974 | West, Jr. | 405/283 |
| 3,842,864 | 10/1974 | Riegel et al. | 138/93 |
| 4,127,141 | 11/1978 | Ledonne et al. | 137/15 |
| 4,144,908 | 3/1979 | Dunn | 138/93 |
| 4,184,504 | 1/1980 | Carmichael et al. | 137/318 |
| 4,351,349 | 9/1982 | Minotti | 137/318 |
| 4,458,721 | 7/1984 | Yie et al. | 137/318 |
| 4,832,069 | 5/1989 | Gale et al. | 137/318 |

FOREIGN PATENT DOCUMENTS

| | | | |
|---|---|---|---|
| 1311017 | 3/1973 | United Kingdom | 138/94 |

*Primary Examiner*—George L. Walton
*Attorney, Agent, or Firm*—Kenneth A. Roddy

[57] ABSTRACT

An apparatus and method for shutting off fluid flow in a pipe main while repairs are being made requires only exposure of the top surface of a buried main and utilizes an anchor system installed in or above the excavation which supports an elongate tubular seal tube against the exposed surface of the main to extend radially therefrom. A jack mechanism compresses the lower end of the seal tube containing a seal member against the exterior surface of the main. A tubular cutting tool installed inside the seal tube is rotated by an air motor to cut a hole in the side wall of the main. A tubular sealant application tool installed inside the seal tube has a nozzle at its bottom end that sprays liquid sealant material onto the interior surface of the main and is then removed. A tubular bladder deployment tool installed inside the seal tube carries a pair of deflated bladders. The bladders are deployed from the deployment tool in opposed direction into the interior of the main along the longitudinal axis of the main and are then inflated to expand and form a seal to shut off fluid flow in the main. After repairs have been made, the bladders are deflated and retracted and the bladder deployment tool is removed. A tubular thread tapping and plugging tool is installed inside the seal tube and rotated to form threads in the cut hole and then removed and then installed again to secure a threaded plug into the hole. After the hole has been plugged, the seal tube is removed.

34 Claims, 13 Drawing Sheets

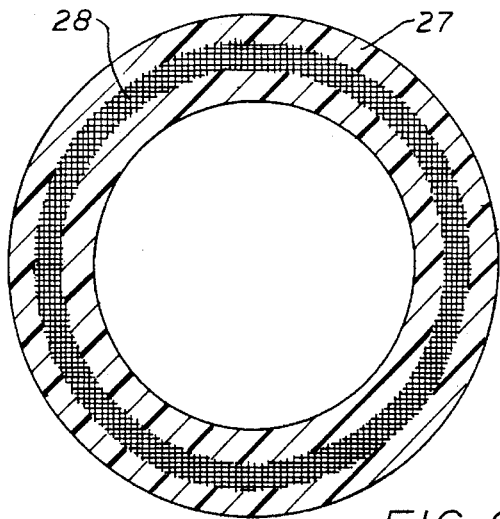
FIG. 6
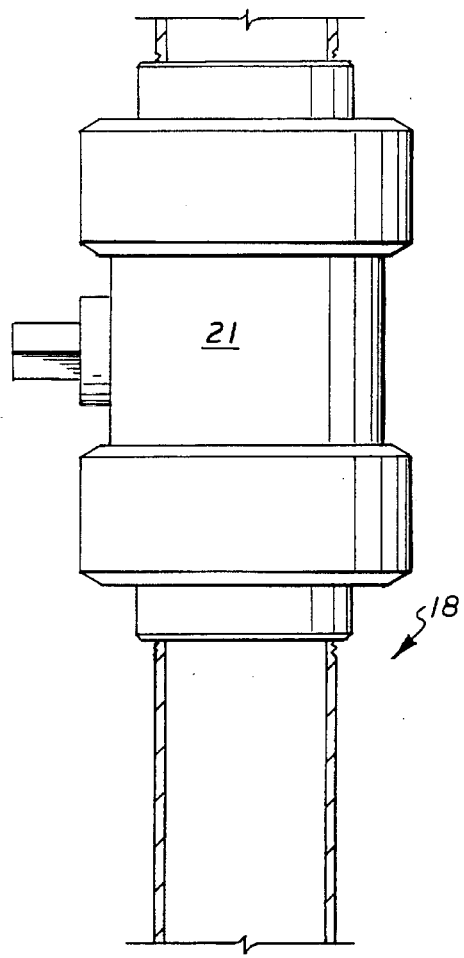
FIG. 5B
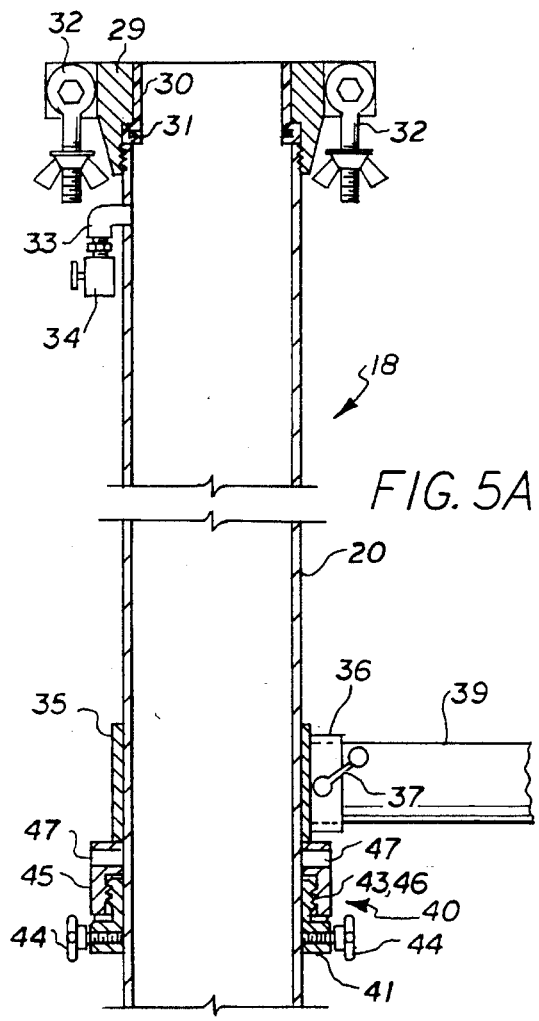
FIG. 5A
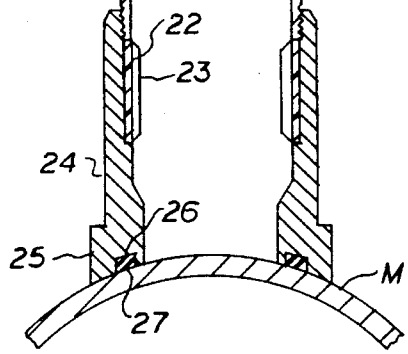

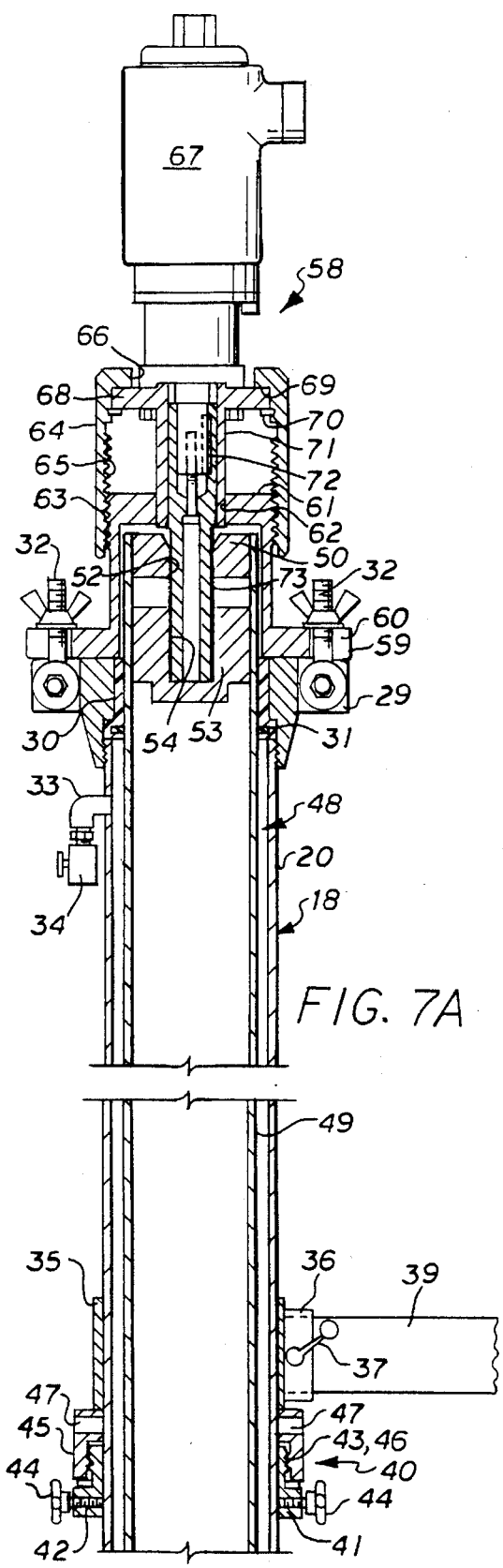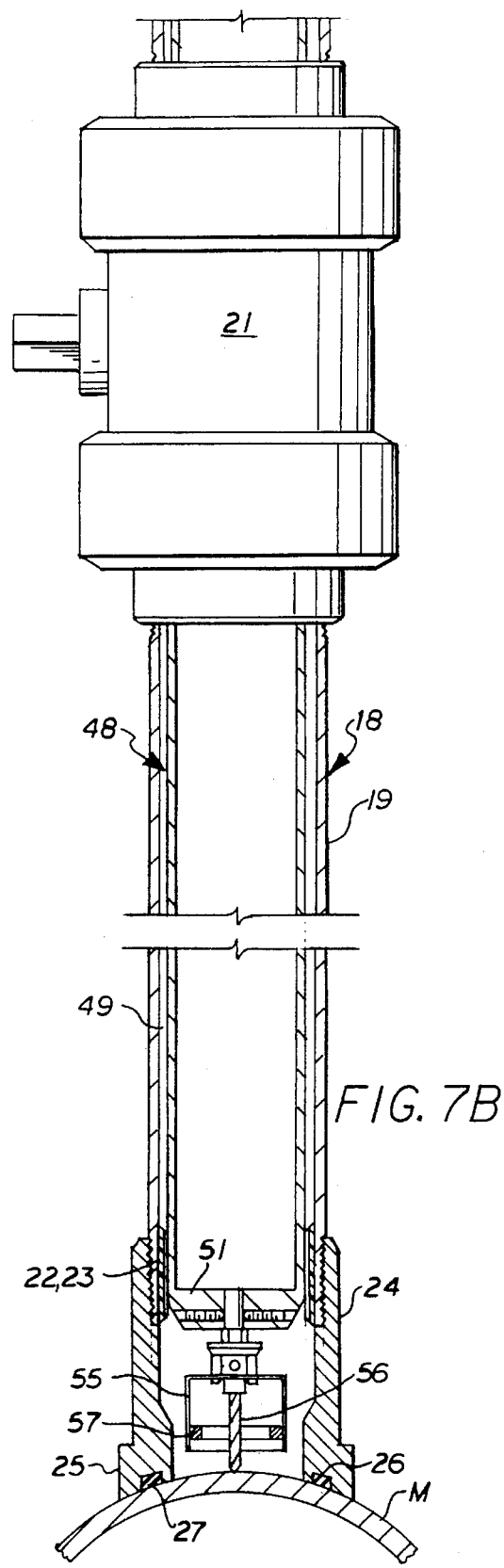
FIG. 7A
FIG. 7B

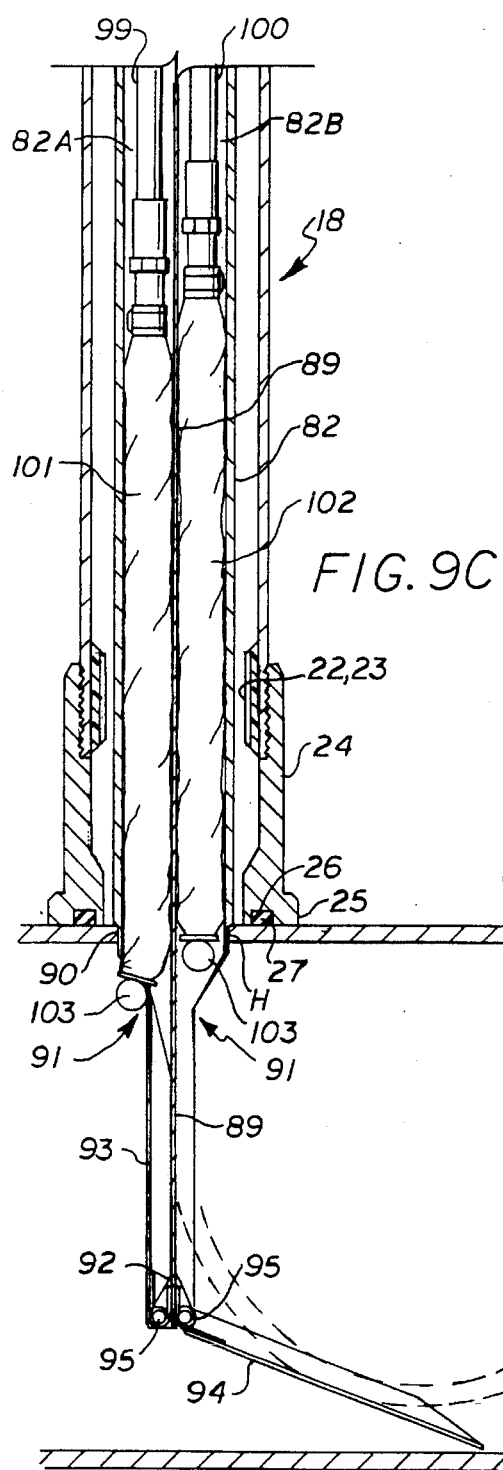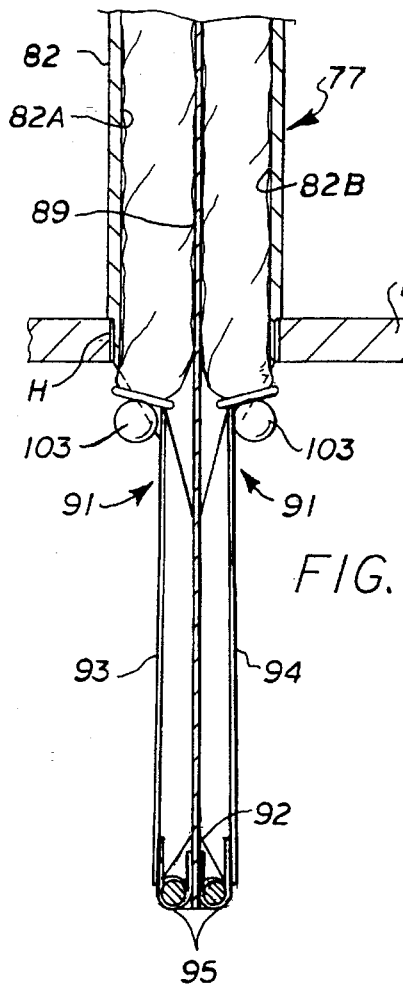

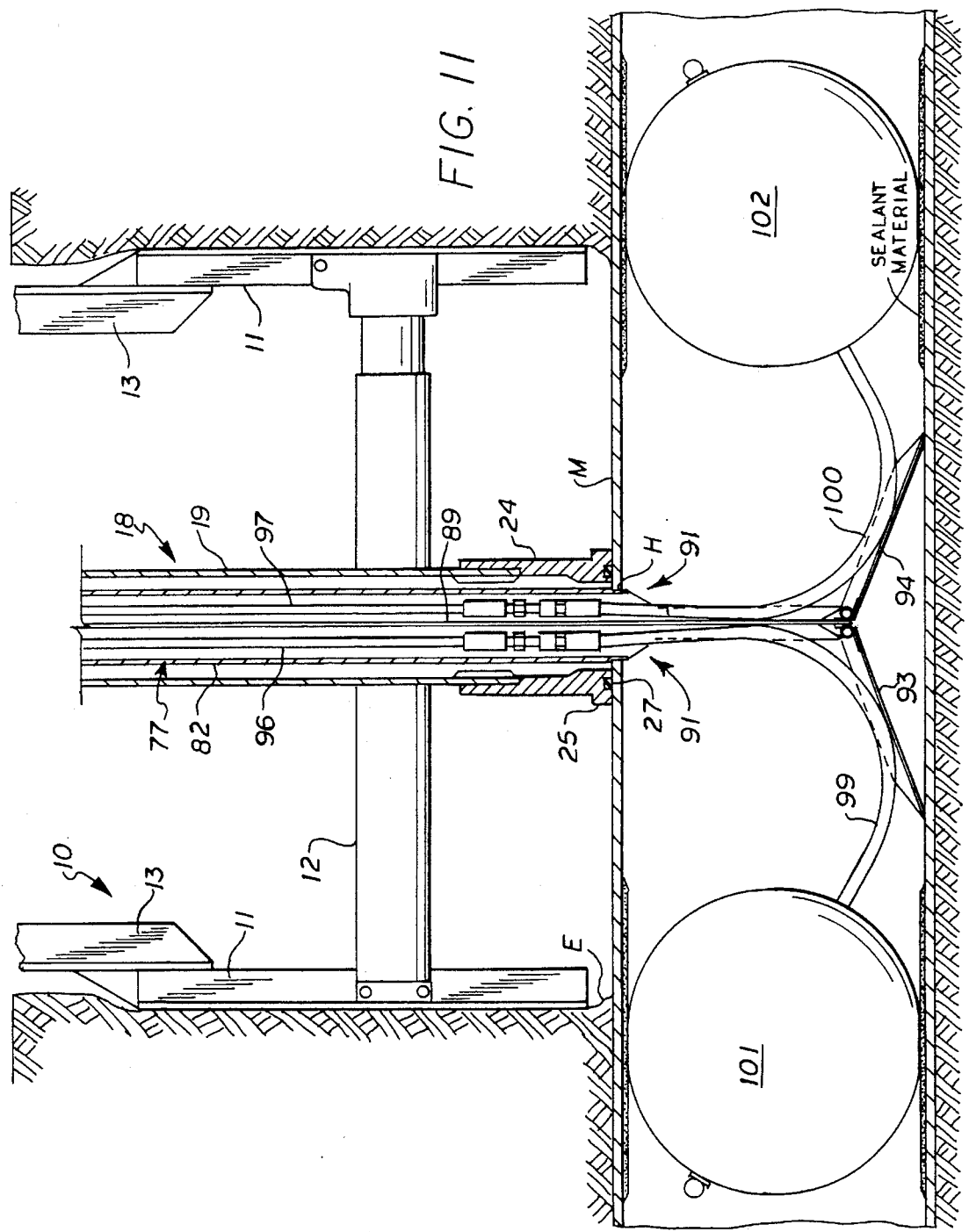

APPARATUS AND METHOD FOR SHUTTING OFF FLUID FLOW IN A PIPE MAIN

BACKGROUND OF THE INVENTION

1. Field of the Invention

This invention relates generally to apparatus and methods for shutting off flow in a conduit, and more particularly to an apparatus and method that requires only minimal excavation to expose the top surface of a buried pipe main and utilizes an anchor apparatus installed in the excavation to support an elongate hollow tube normal to the main in sealing relation on the exterior of the main through which tools are passed to form a hole in the side wall of the main, removably install inflatable bladders to seal off the flow in the main while repairs are made downstream, and to plug the formed hole when repairs are completed.

2. Brief Description of the Prior Art

One of the many important tasks for a gas utility is to respond to emergencies that involve or may involve natural gas. The types of emergencies vary, but one of the more important, involves a broken or breached gas main. Gas mains can be damaged in many ways, such as breakage from excavating equipment (i.e., backhoe), excessive soil settlement, failure due to age, and washouts from broken water mains. When a gas main is breached or broken, the gas normally transported and contained within the pipe escapes to the atmosphere causing a fire or explosion hazard. If the failure is due to a washout, water can enter the main, flood the gas system, and cause a loss of service to the attached customers. In either case, the gas utility must regain control as quickly as possible by stopping the escaping gas or influx of water. Conventional methods for blocking flow in buried gas mains require extensive excavation to completely uncover the main for deployment of plugging equipment and are quite time consuming.

One common method for blocking flow in the main is to attach a saddle to the main and install equipment to drill into the main and insert a stopper. Typically, the saddle mounting hardware consists of bolts or chains that attach to each side of the saddle and wrap around the pipe. Some mechanical method of tightening the bolts or chains is usually supplied. To install the saddle clamping chains or hardware, soil must be excavated completely around the pipe to allow access from all sides so that the chains or hardware can be wrapped under the main, and the exterior of the pipe must be extensively cleaned to allow sealing. As a result, excavations are large and many times must be hand dug, increasing excavation time. This extra excavation and extensive cleaning adds significant amounts of time to the stopping process, thus increasing the danger from potential explosions, fire damage or the influx of water. In addition, the current drilling and stopping equipment take a long time to set up and complete the job once the main is exposed.

Calandra, U.S. Pat. No. 4,013,097 discloses an apparatus for damming the flow of fluid in a pipeline comprising an inflatable bladder attached to the end of an elongate umbilical tube and encompassed within a flexible outer bag of resilient material with a viscous fluid between the bladder and the bag. The apparatus is deployed parallel to the longitudinal axis of the pipeline and the bladder is inflated to force, through the viscous fluid, the outer bag into sealing engagement with the pipeline interior.

DeGiovanni, U.S. Pat. No. 4,155,373 discloses a method for shutting off gas flow in plastic pipes wherein a tubular plastic fitting is joined to the wall of a plastic gas pipe by fusion and a hole is cut through the plastic gas pipe and then a balloon-type stopper is inserted into the gas pipe and inflated.

Yie et al, U.S. Pat. No. 4,291,727 discloses an inflatable expandable flexible sleeve and insertion apparatus which is connected to a saddle attached to the pipeline by U-bolts. To install the saddle clamping U-bolts, soil must be excavated completely around the pipeline.

Minotti, U.S. Pat. No. 4,351,349 discloses pipe repair kit including an inflatable bladder and a system of conduits which are secured to the pipe exterior in longitudinally spaced relation by a plurality of two-piece clamps which extend completely around the circumference of the pipe. This method and apparatus requires a large excavation and the soil must be excavated completely around the pipeline at several locations.

The present invention is distinguished over the prior art in general, and these patents in particular by an apparatus and method for shutting off fluid flow in a pipe main while repairs are being made which requires only exposure of the top surface of a buried main and only minimal cleaning of the exposed surface. An anchor system installed in or above the excavation supports an elongate tubular seal tube against the exposed surface of the main to extend radially therefrom. A jack mechanism compresses the lower end of the seal tube containing a seal member against the exterior surface of the main. A tubular cutting tool installed inside the seal tube is rotated by an air motor to cut a hole in the side wall of the main. A tubular sealant application tool installed inside the seal tube has a nozzle at its bottom end that sprays liquid sealant material onto the interior surface of the main and is then removed. A tubular bladder deployment tool installed inside the seal tube carries a pair of deflated bladders. The bladders are deployed from the deployment tool in opposed direction into the interior of the main along the longitudinal axis of the main and are then inflated to expand and form a seal to shut off fluid flow in the main. After repairs have been made, the bladders are deflated and retracted and the bladder deployment tool is removed. A tubular thread tapping and plugging tool is installed inside the seal tube and rotated to form threads in the cut hole and then removed and then installed again to secure a threaded plug into the hole. After the hole has been plugged, the seal tube is removed.

SUMMARY OF THE INVENTION

It is therefore an object of the present invention to provide an emergency stop-off system that minimizes excavation, deploys quickly, and can drill through and place a stopper in a pipe main in a minimum amount of time.

It is another object of this invention to provide an emergency stop-off system having an anchor system which is quickly deployed and secures the shut-off apparatus to the main.

Another object of this invention is to provide an emergency stop-off system which requires excavation of only a minimal portion of the top surface of the main to install the shut-off apparatus.

Another object of this invention is to provide an emergency stop-off system which allows all work to be accomplished from street level such that the excavation pit does not have to be sized to accommodate worker entry.

Another object of this invention is to provide an apparatus and method for shutting off fluid flow in a pipe main which creates a bubble-tight gas seal between the outside wall of the main and a hollow seal tube placed against the outside wall of the pipe that has a valve, stripper seal, and vent port, to prevent fluids from escaping from the main while allowing controlled venting and insertion of various work tools through the hollow seal tube for performing functions on and within the main.

Another object of this invention is to provide an apparatus and method for shutting off fluid flow in a pipe main whereby a hollow seal tube may be sealingly engaged with the outside wall of the main to extend normal to the longitudinal axis of the pipe over a range of angular orientations ranging from vertical to horizontal.

Another object of this invention is to provide an apparatus and method for shutting off fluid flow in a pipe main whereby a hollow seal tube is engaged with the exterior surface of the main with a compliant seal which requires only minimal cleaning to effect a fluid tight seal on the exterior surface.

Another object of this invention is to provide an apparatus and method for shutting off fluid flow in a pipe main wherein a hole is drilled in the side wall of the main by a circular hole saw driven by a rotary drilling motor mounted upon the top of a hollow seal tube sealingly engaged on the outside wall of the main and which catches the drilled material core and removes it through the hollow seal tube.

Another object of this invention is to provide an apparatus and method for shutting off fluid flow in a pipe main which deploys a pair of independently controlled inflatable bladders into the main to seal off fluid flow in the main and allow controlled purging of the main.

Another object of this invention is to provide an apparatus and method for shutting off fluid flow in a pipe main which utilizes a liquid sealant and deploys a pair of independently controlled inflatable bladders to improve seal effectiveness in pipe mains having debris, corrosion, or exceptionally rough surfaces in the interior.

Another object of this invention is to provide an apparatus and method for shutting off fluid flow in a pipe main which allows the pipe main to be tapped and sealed after completion of repair operations.

A further object of this invention is to provide an apparatus and method for shutting off fluid flow in a pipe main which allows the effectiveness of the sealing apparatus to be tested during and after installation of the seal.

A still further object of this invention is to provide an apparatus for shutting off fluid flow in a pipe main which is simple in construction, economical to manufacture, and reliable in operation.

Other objects of the invention will become apparent from time to time throughout the specification and claims as hereinafter related.

The above noted objects and other objects of the invention are accomplished by an apparatus and method for shutting off fluid flow in a pipe main while repairs are being made which requires only exposure of the top surface of a buried main and only minimal cleaning of the exposed surface. An anchor system installed in or above the excavation which supports an elongate tubular seal tube against the exposed surface of the main to extend radially therefrom. A jack mechanism compresses the lower end of the seal tube containing a seal member against the exterior surface of the main. A tubular cutting tool installed inside the seal tube is rotated by an air motor to cut a hole in the side wall of the main. A tubular sealant application tool installed inside the seal tube has a nozzle at its bottom end that sprays liquid sealant material onto the interior surface of the main and is then removed. A tubular bladder deployment tool installed inside the seal tube carries a pair of deflated bladders. The bladders are deployed from the deployment tool in opposed direction into the interior of the main along the longitudinal axis of the main and are then inflated to expand and form a seal to shut off fluid flow in the main. After repairs have been made, the bladders are deflated and retracted and the bladder deployment tool is removed. A tubular thread tapping and plugging tool is installed inside the seal tube and rotated to form threads in the cut hole and then removed and then installed again to secure a threaded plug into the hole. After the hole has been plugged, the seal tube is removed.

BRIEF DESCRIPTION OF THE DRAWINGS

FIGS. 5A and 5B taken together are a cross section through the seal tube assembly of the present invention.

FIG. 6 is a schematic cross section through the seal ring member which is installed in the seal foot of the seal tube assembly.

FIGS. 7A and 7B taken together are a cross section through the seal tube assembly showing a cutting tool installed therein.

FIGS. 9A, 9B, and 9C taken together are a cross section through the seal tube assembly showing a bladder deployment tool installed therein with one ramp pivoted outward.

FIG. 10 is an enlarged cross section through the lower portion of the bladder deployment tool showing the ramp hinge detail.

FIG. 11 is a cross section through the lower portion of the bladder deployment tool showing schematically both bladders deployed and inflated.

DESCRIPTION OF THE PREFERRED EMBODIMENT

Figure 1:
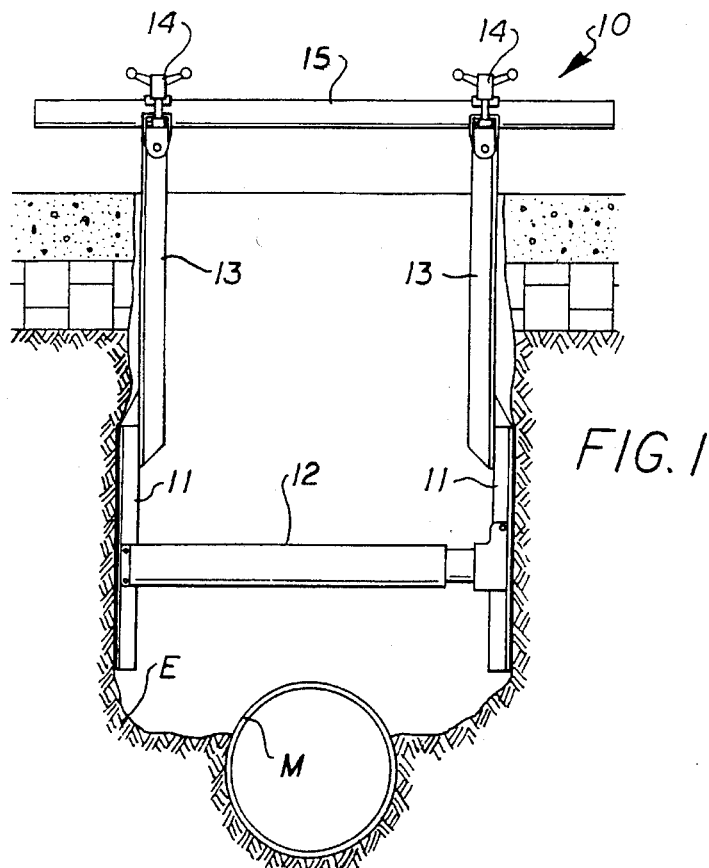
FIG. 1 is a cross section through an excavation showing an anchoring platform system in accordance with the present invention installed in the excavation above a pipe main.

Referring to the drawings by numerals of reference, there is shown somewhat schematically in FIG. 1, an excavation E which has been dug to a depth sufficient to expose the upper surface of a buried pipe main M. An anchoring platform system 10 is shown deployed in the excavation E. The anchoring platform 10 has a pair of flat rectangular panels 11, or shoring members, mounted in opposed parallel relation at each end of a horizontally disposed expandable jack member 12. The jack member 12 may be either mechanical or hydraulic, and, when expanded will push against the sides of the excavation E. The opposed panels 11 are sized such that their surface area will distribute the load to acceptable levels so that the soil is not displaced a significant amount. However, the friction force between the panels 11 and the walls of the excavation E is significant and creates a firm stable platform for anchoring the elongate seal tube assembly described hereinafter. If more stability is required, stakes can be attached to the panels 11 and pushed into the surrounding soil during installation.

A vertical beam, or support brace 13 is secured to each panel 11 and extends upwardly therefrom to just above ground level and a quick disconnect clamp 14 is secured to the top end of each brace. A tubular horizontal cross bar 15 is removably clamped to the top ends of the vertical support braces 13 by the clamps 14 to span the excavation above the main. The horizontal cross bar 15 serves as the attachment point for the seal tube assembly through which various tool will be passed for drilling a hole in the pipe main inserting inflatable bladders and plugging the hole, as described hereinafter.

Figure 2:
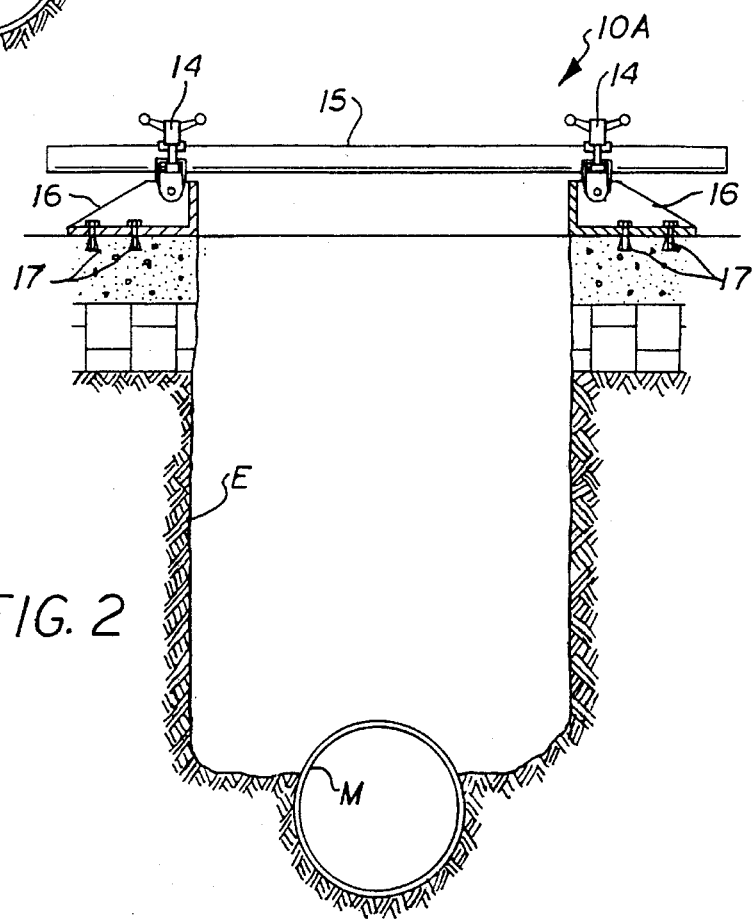
FIG. 2 is a cross section through an excavation showing an alternate anchoring system in accordance with the present invention secured on the ground surface at the top of the excavation.
Figure 3:
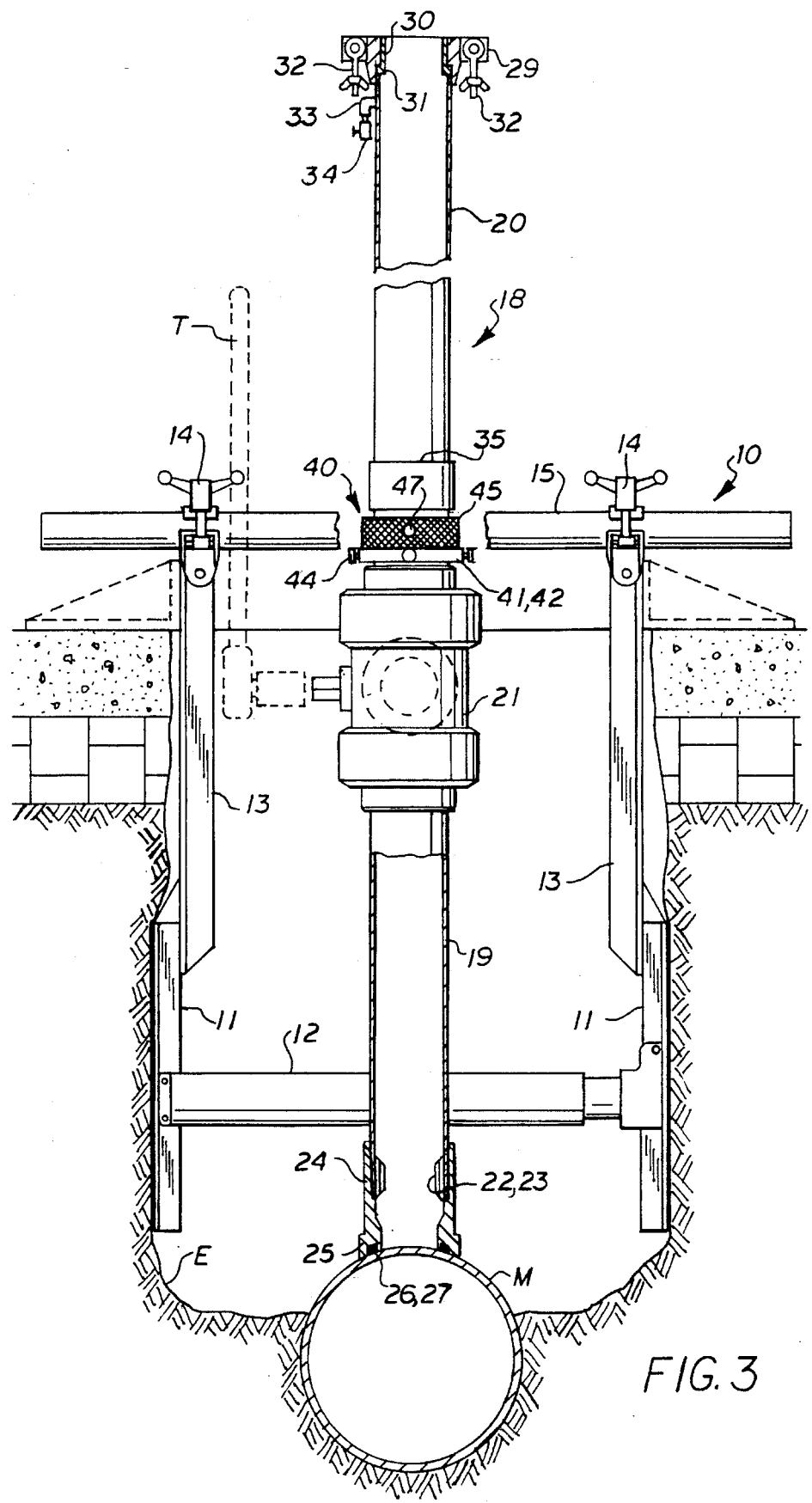
FIG. 3 is a cross section through the excavation and anchoring system of FIG. 1 showing a seal tube assembly installed on the pipe main.

FIG. 2 shows an alternate embodiment of the anchoring platform system 10A. In this embodiment, a pair of opposed anchor plate members 16 are bolted to the ground or street surface on each side of the excavation by expanding bolts 17, and a quick release clamp 14 is secured to each anchor plate. The tubular horizontal cross bar 15 is removably clamped to the top ends of the anchor plates 16 to span the excavation above the pipe main M.

Referring now to FIGS. 3, 4, 5A, and 5B, the exposed surface of the pipe main M is cleaned using conventional methods, and an elongate seal tube assembly 18 is positioned on the main closely adjacent the horizontal cross bar 15. The seal tube assembly 18 has an elongate tubular lower section 19 and upper section 20 each having external threads at each end. A ball valve 21 is threadedly engaged at the top end of the lower section 19. A tubular bearing member 22 formed of low friction material is secured to the interior of the lower section 19 and has vertical slots 23 along its central bore. A seal foot member 24 having an internally threaded upper end and a central bore is threadedly engaged on the bottom end of the lower section 19 of the seal tube assembly 18. The seal foot 24 has a concave bottom flange 25 with an annular seal ring groove 26 surrounding its central bore which receives a seal ring 27. The concave bottom flange 25 engages the outer surface of the pipe main M, and several interchangeable foot members are provided for fitting different diameter mains.

As shown somewhat schematically in FIG. 6, the seal ring 27 is a soft toroid formed of compliant material such as "Plastisol F-62" having a fiberous metallic ring formed of wire cloth 28 imbedded therein. The compliant material of the seal ring 27 gives it excellent gap filling capabilities which allows it to form a bubble-tight gas seal even against rough corroded pipe at low loads. The wire cloth reinforcing 28 in the seal ring 27 allows for gap filling but prevents extrusion under pressure.

The threaded bottom end of the elongate tubular upper section 20 of the seal tube assembly 18 is threadedly engaged in the upper end of the ball valve 21 and a flange 29 is threadedly engaged on the top end. A tubular bearing member 30 formed of low friction material is secured to the interior of the flange 29 and has a resilient flat circular gland-type stripper seal 31 extending a short distance radially inward from its central bore. Circumferentially spaced wing bolts 32 are pivotally connected in slots in the outer periphery of the flange 29. A vent pipe 33 is secured in the side wall of the upper section 20 beneath the bearing 30 and seal 31 and has a valve 34 connected at its outer end to vent pressure from the interior of the seal tube assembly 18. A collar 35 is slidably received on the exterior of the upper section 20 and has a short tubular extension 36 extending outwardly therefrom. A locking lever 37 having a threaded shank extends through a tapped hole in the side wall of the short tubular extension 36.

Figure 4:
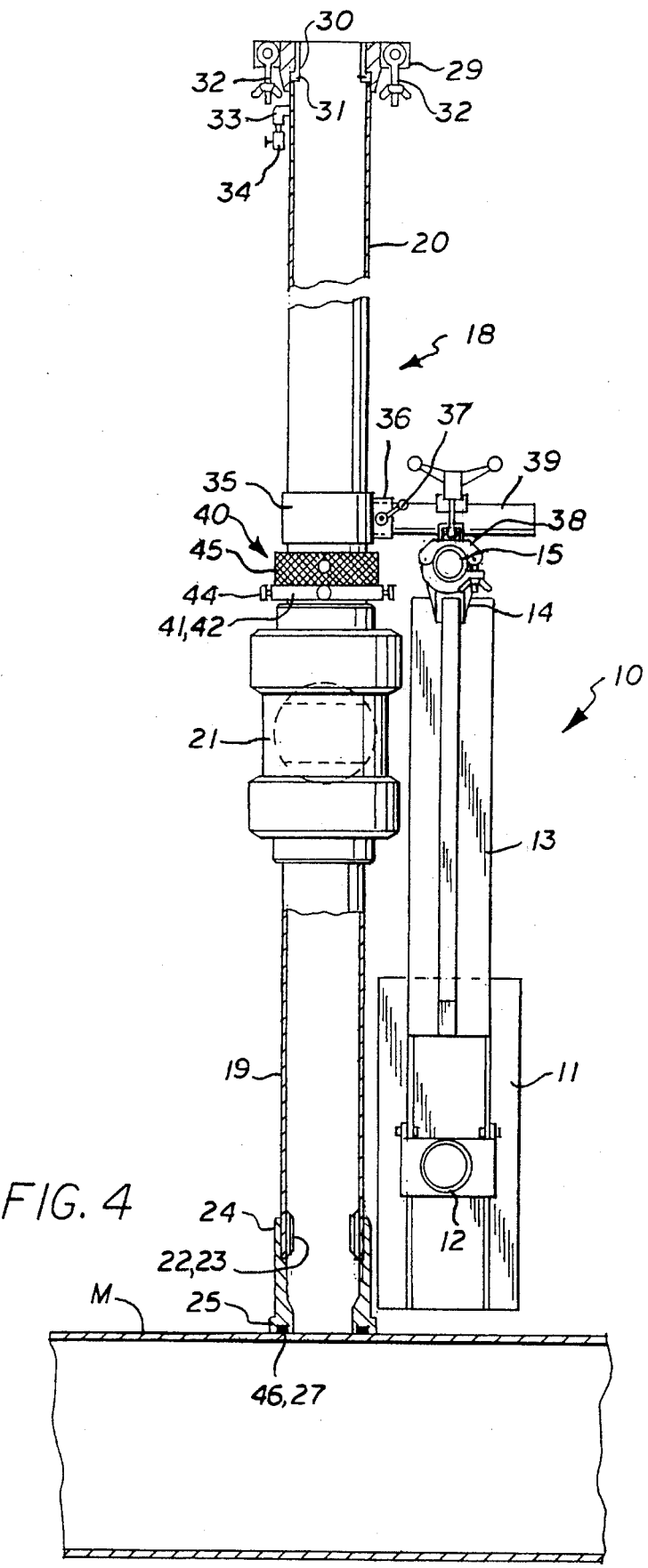
FIG. 4 is a cross section through the excavation and anchoring system of FIG. 3 shown from the side.

As seen from the side in FIG. 4, a clamp 38 is slidably mounted on the horizontal cross bar 15. The clamp 38 can be positioned longitudinally along the horizontal cross bar 15 and then clamped into position thereon. One end of a short tubular member 39 is received in the short tubular extension 36 of the collar 35 and its other end extends through the sliding clamp 38 mounted on the horizontal cross bar 15 to connect the seal tube assembly 18 to the anchor assembly 10.

As best seen in FIGS. 5A and 5B, a rotatable screw jack mechanism 40 is slidably mounted on the upper section 20 between the top of the ball valve 21 and the bottom of the collar 35. The screw jack mechanism 40 has a tubular lower member 41 with a flanged bottom end 42 and an externally threaded upper portion 43. A series of lockdown bolts 44 with threaded shanks and knobs on their outer ends are threadedly engaged in tapped holes extending radially through the flanged bottom 42. The lockdown bolts 44 are screwed in and out to engage or disengage the lower section 20. A rotatable cap 45 having internal threads is threadedly received on the threaded upper portion 43 of the lower member 41. Holes 47 extend through the side wall of the cap 45 to receive a suitable tool to facilitate rotation. Rotation of the cap 45 in one direction will cause the assembled cap and lower member 41 to be drawn together and rotation in the opposite direction will cause vertical expansion.

The seal tube assembly 18 is manually positioned to extend normal to the longitudinal axis of the pipe main M by adjusting the sliding clamp 38 to the appropriate position on the horizontal cross bar 15. The sliding clamp 38 allows the seal tube assembly 18 to be angled to contact the main normal to the longitudinal axis of the main in the event that obstacles prevent direct vertical positioning.

Once the seal tube assembly 18 has been properly positioned, the short tubular member 39 is locked in place by securing the clamp 38 to secure the seal tube assembly 18 to the anchor assembly 10. The cap 45 of the screw jack mechanism 40 is rotated to vertically contract the mechanism and the screw jack mechanism is slid upwardly on the upper section 20 of the seal tube assembly 18 until the top end of the cap 45 engages the bottom end of the collar 35 and the lockdown bolts 44 are screwed in to engage the lower section 20 and securely lock the lower member 41 of the screw jack to the lower section. Then, the cap 45 is rotated to cause the screw jack members to expand vertically. The cap 45 is captured against the bottom of the collar 35 and the rotation causes a downward force to be exerted on the concave flange 25 of the seal foot 24 to push the seal foot against the pipe main M and compress the seal ring 27 to effect a sealing relation on the exterior surface of the main. Rotating locking lever 37 locks the seal tube 15 to the main M.

The ball valve 21 in its full-open position allows tools to be passed through the seal tube 18 but can be closed between operation to prevent blowing gas. The ball valve 21 is opened and closed by a tool T extended from the top of the excavation.

As shown in FIGS. 7A and 7B, after the seal tube assembly 18 has been secured to the pipe main M, an elongate tubular cutting tool assembly 48 is lowered into the seal tube 18 through the bearing 30 and seal 31, through the open ball valve 21, and through the bearing 22 in the lower section 19. The cutting tool assembly 48 has an elongate tubular drive tube 49 which is enclosed at its top and bottom end by end plates 50 and 51. The top end plate 50 has a square bore 52. A socket plate 53 is secured to the interior of the drive tube 49 beneath the top end plate 50 and has a longitudinal square socket 54 extending downwardly from its top end. A circular hole saw 55 having a pilot bit 56 is mounted on the enclosed bottom end of the drive tube 49 and rests on the exterior of the pipe main M. A magnet 57 is secured inside the saw blade to catch the drilled material.

The cutting tool assembly 48 is powered by an air motor assembly 58 having a flange 59 at its bottom end which is received over the top end of the drive tube 49 and mounted on the flange 29 at the top of the upper section 20 of the seal tube 18 and secured by the wing bolts 32 which are received in slots 60 in the flange 59. The upper portion of the flange 59 is enclosed by an end wall 61 having a hexagonal bore 62 and is externally threaded 63. A rotatable cap 64 having internal threads 65 and a central bore 66 is threadedly received on the threaded upper portion 63 of the flange 59. An air motor 67 is bolted to a circular plate 68 which is rotatably retained beneath a radial shoulder 69 in the central bore 66 of the cap 64 by a snap ring 70. The plate 68 has a hexagonal extension 71 which is slidably received through the heaxgonal bore 62 in the end wall 61 of the flange 59. The drive shaft 72 of the air motor is secured to a tubular adapter 73 having a cylindrical upper end which extends rotatably through the hexagonal extension 71 and a square lower portion which is received through the square bore 52 in the top end plate 50 of the drive tube 49 and in the square socket 54 in the socket plate 53 at the upper end of the drive tube.

When the air motor 67 is in operation, its drive shaft 72 rotates the elongate tubular drive tube 49 which rotates the hole saw 55 and pilot bit 56. The cap 64 at the upper end of the air motor assembly 58 is used to lower the pilot bit 56 and circular saw blade 55 onto the side wall of the pipe main M. Manual rotation of the cap 64 in one direction will cause the bit and blade to be lowered vertically and rotation in the opposite direction will raise the bit and blade. As the pipe main material is cut away, it is captured by the magnet 57. The cut out piece of the side wall of the pipe main is captured in the circular saw blade 55 and may be further retained by the magnet 57 or a retainer wire connected to the pilot bit 56. The horsepower of the preferred air motor is adequate to drill through mains quickly, but is not so high as to damage bits during the drilling operation. A suitable cooling liquid may be introduced through the vent pipe 33 into the annulus between the exterior of the drive tube 49 and the interior of the seal tube 18 to flow through the slotted bearing 22 in the lower section 19 and onto the saw blade 55 during the drilling and cutting operation. The circular hole saw 55 cuts a very thin kerf, minimizing the amount of material that needs to be machined, and the low cost of such a saw allows it to be expendable such that for emergency purposes, a new saw blade can be used each time. These two factors result in drilling times of 2 to 3 minutes for most mains.

After a hole H has been formed in the side wall of the pipe main M, the wing bolts 32 are loosened and moved out of the slots in the flange 59 and the cutting tool assembly 48 is lifted out of the seal tube 18. The ball valve 21 can then be closed if required.

Figure 8:
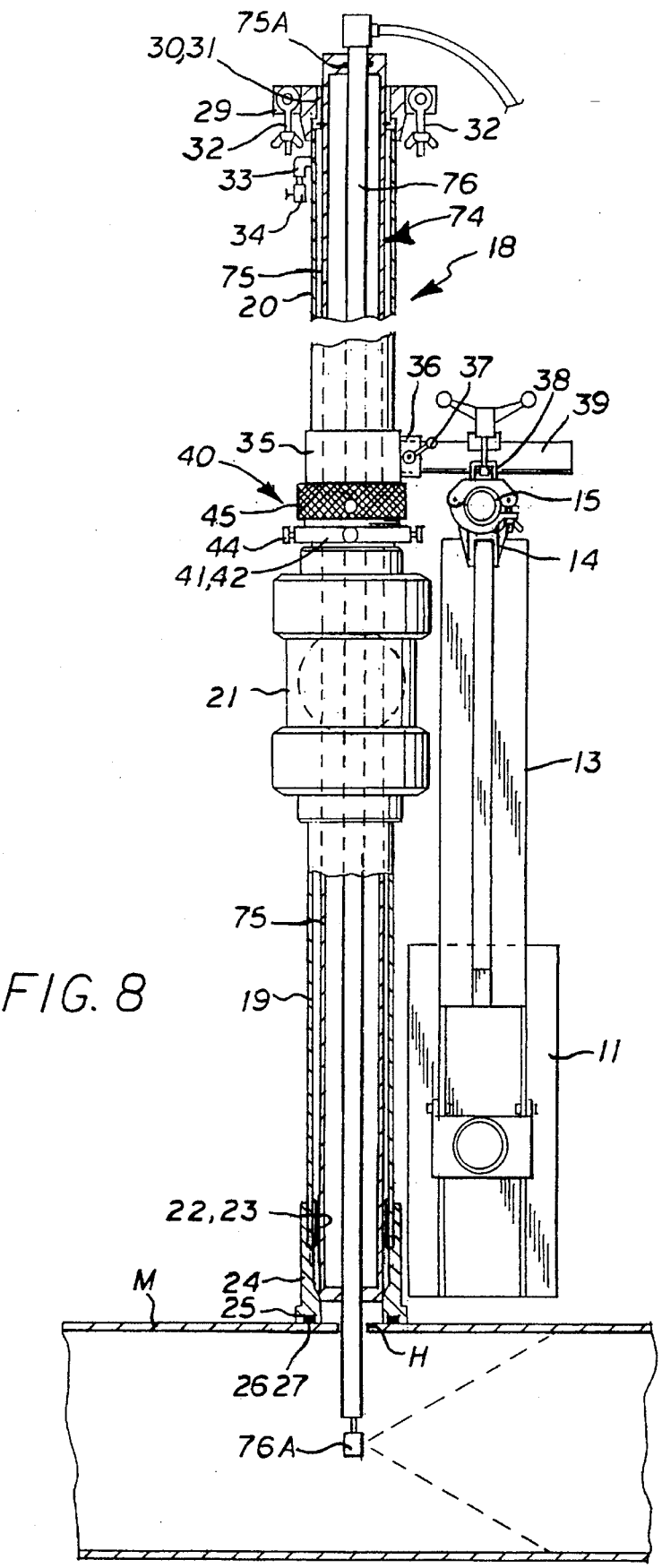
FIG. 8 is a cross section through the seal tube assembly showing somewhat schematically a sealant injection tool installed therein.
Figure 9A:
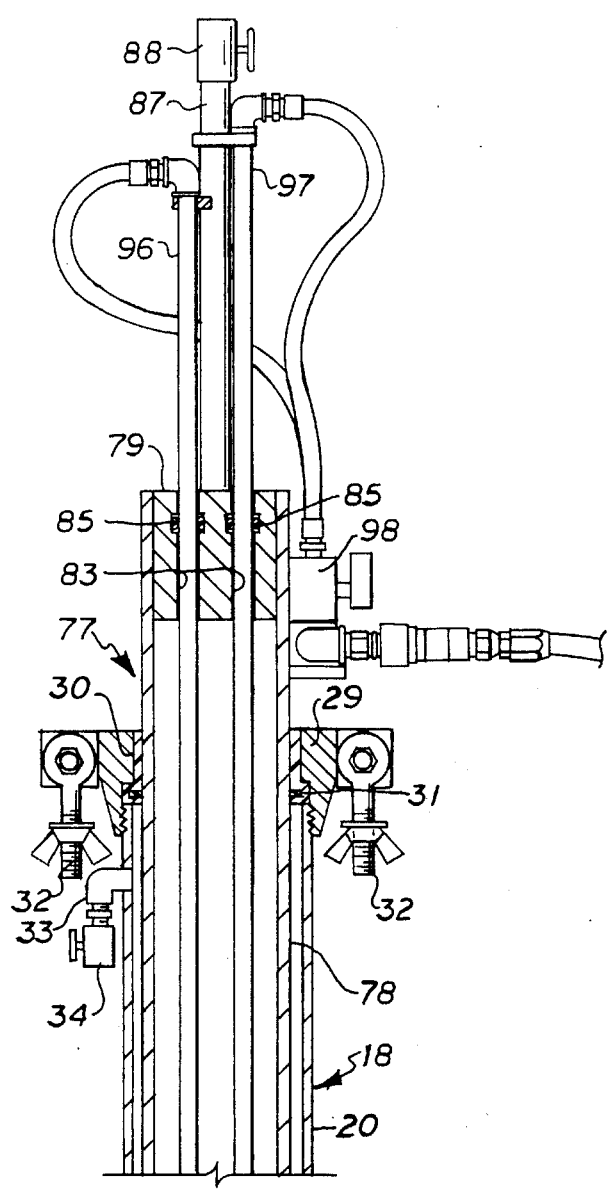
Figure 9B:
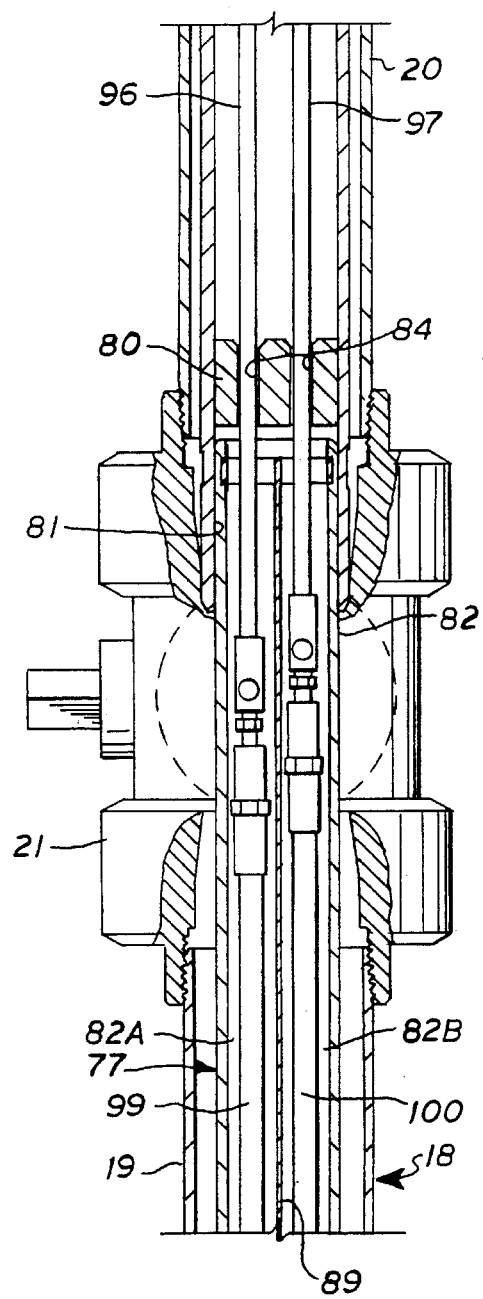

As shown schematically in FIG. 8, a special high-viscosity liquid polymer in the form of a thick gel or grease, such as "Polywater" (TM) manufactured by American Polywater Company is then applied under pressure to the inside diameter of the main. This is accomplished by a lowering an elongate tubular sealant application tool 74 into the seal tube 18. The sealant application tool 74 has a hollow tubular outer housing 75 enclosed at the top and bottom ends through which a smaller diameter tube 76 extends. The tube 76 has a hollow-cone nozzle 76A at its bottom end and is connected at its top end to a source of the sealant under pressure. The outer housing 75 extends through the top seal 31 and bearings 30 and 22 of the seal tube 18 and the inner tube 75 extends through a seal 75A at the top end of the outer housing and is manually raised and lowered and rotated to spray the sealant liberally onto the interior of the pipe main M. Because of its viscosity, the polymer sealant will fill small voids and imperfections in the interior surface of the main when inflatable bladders are installed (described below).

After the liquid polymer sealant has been applied to the interior of the main, the sealant application tool 74 is removed and a bladder deployment tool 77 is lowered into the seal tube 18. As shown in FIGS. 9A, 9B, 9C, and 10, the bladder deployment tool 77 has an elongate tubular upper section 78 enclosed at its top end by a wall 79 and has a wall 80 a short distance above its bottom end 81. The top end of an elongate tubular lower section 82 is secured in the bottom end 81 of the upper section 78. The wall 79 at the top end of the upper section 78 has a pair of laterally spaced parallel holes 83 extending therethrough which are axially aligned with a pair of laterally spaced parallel holes 84 extending through the wall 80 at the lower end. 0-ring seals 85 surround the holes 83. A vent pipe 87 extends upwardly from the top wall 79 of the upper section 78 and has a valve 88 connected at its outer end to vent pressure from the interior of the bladder deployment tool 77.

The interior of the lower section 82 of the bladder deployment tool 77 is divided into two compartments 82A and 82B by a vertical divider plate 89. The exterior of the lower section 82 has a reduced diameter 90 which is received through the hole H that has been cut in the side wall of the pipe main M. Each side of the reduced diameter portion 90 is cut away to form opposed elongate longitudinal openings 91 and an inverted V-shaped member 92 is secured to the bottom end of the divider plate 89. A pair of rectangular ramp members 93 and 94 are hinged at their bottom ends to the inverted V-shaped member by a spring hinge 95 to pivot relative thereto in opposed relation. The spring hinges 95 urge the top end of the ramp members 93 and 94 to normally pivot outwardly and downwardly relative to the longitudinal axis of the lower portion 90. The preferred ramp members are made of a non-sparking material for safety.

A pair of elongate rigid tubes 96 and 97 are slidably mounted in the parallel holes 83 and 84 in the upper section 78 and extend beyond the top and bottom ends thereof. The top ends of the tubes 96 and 97 are connected by conduit to a valve assembly 98 which is connected to a source of pressurized air and their bottom ends are connected to the top end of flexible conduits 99 and 100. The bottom ends of the flexible conduits 99 and 100 are connected to inflatable bladders 101 and 102. Each flexible bladder 101 and 102 has a small spherical ball 103 secured to its exterior opposite the connection to the conduits 99 and 100.

To initially install the bladders 101 and 102 in the deployment tool 77, the ramp members 93 and 94 are pivoted upwardly and inwardly against the divider plate 89 and the rigid tubes 96 and 97 are lowered so that the bottom end of the flexible conduits 99 and 100 are extended outwardly to the exterior of the lower portion 90. The bladders 101 and 102, in a deflated condition, are connected to the bottom ends of the conduits 99 and 100, folded or rolled into a generally tubular configuration, and then the tubes 96 and 97 are pulled upwardly to draw the rolled bladders into the compartments 82A and 82B such that the balls 103 are captured between the top end of the openings 91 and the outwardly biased top ends of the ramp members 93 and 94. In this position, the balls 103 prevent the spring hinges 95 from pivoting the ramp members, as shown in FIG. 10.

After the bladders have been installed in their respective compartments, the bladder deployment tool 77 is lowered into the seal tube 18 until the reduced diameter portion 90 extends through the hole H in the pipe main M. Once the bladder deployment tool is in place, the two ramps 93 and 94 are released independently by pulling the tubes 96 and 97 upwardly a short distance. This retracts the ball 103 at the end of the respective bladder upwardly to clear the top end of the ramp and then the force of the spring hinge 95 urges the top end of the ramp member to pivot outwardly and downwardly relative to the longitudinal axis of the lower section 90 until they engage the interior surface of the pipe main M, as shown on the right hand side of FIG. 9C. In the deployed position, the ramps 93 and 94 are disposed at an outwardly and downwardly inclined angle. In the deployed position, the ramps 93 and 94 guide the bladders 101 and 102 into the pipe main along its longitudinal axis. The bladders 101 and 102 are deployed by pushing downwardly on the tubes 96 and 97 such that the bladders and flexible conduit extend though the openings 91 in the lower section 90 and ride outwardly on the ramps 93 and 94.

As shown somewhat schematically in FIG. 11, to stop the flow of gas in the pipe main, both bladders 101 and 102 are deployed, down stream bladder first, and are then inflated. As the bladders 101 and 102 expand inside the main which has been coated with the polymer sealant material and engage the polymer sealant material it is compressed to fill small gaps between the exterior of the bladders and the interior diameter of the main. This ensures creation of a effective seal even in mains containing debris from water seepage and corrosion products. With both bladders inflated, the seal tube 18 acts a vent pipe, safely venting any gas that leaks past the upstream bladder. The effectiveness of the inflatable bladder seal may be tested by connecting a pressure gauge to valve 88 at the outer end of the vent pipe 87 at the top of the bladder deployment tool 77. The ball valve 21 in the seal tube 18 controls the gas flow when there are no tools in the seal tube. Closing the valve prevents gas from escaping. If a seal is not established after the bladders have been deployed, a sealant may be pumped through the deployment tool to fill the void between the bladders.

Figure 12:
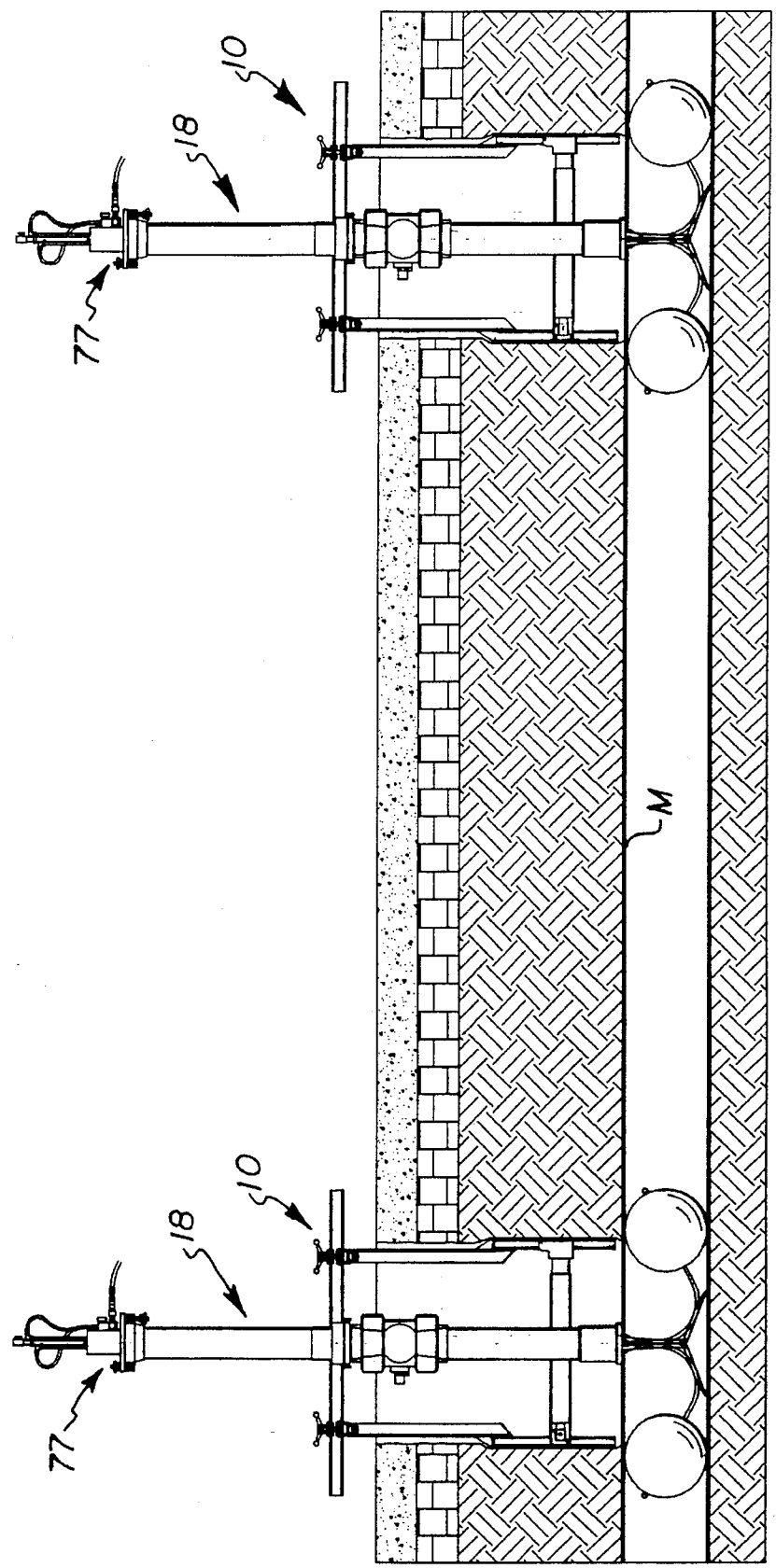
FIGS. 12, 13, and 14 are cross sections through a pair of installations showing schematically the method of deploying the bladders for purging the main before it is restored to service.
Figure 13:
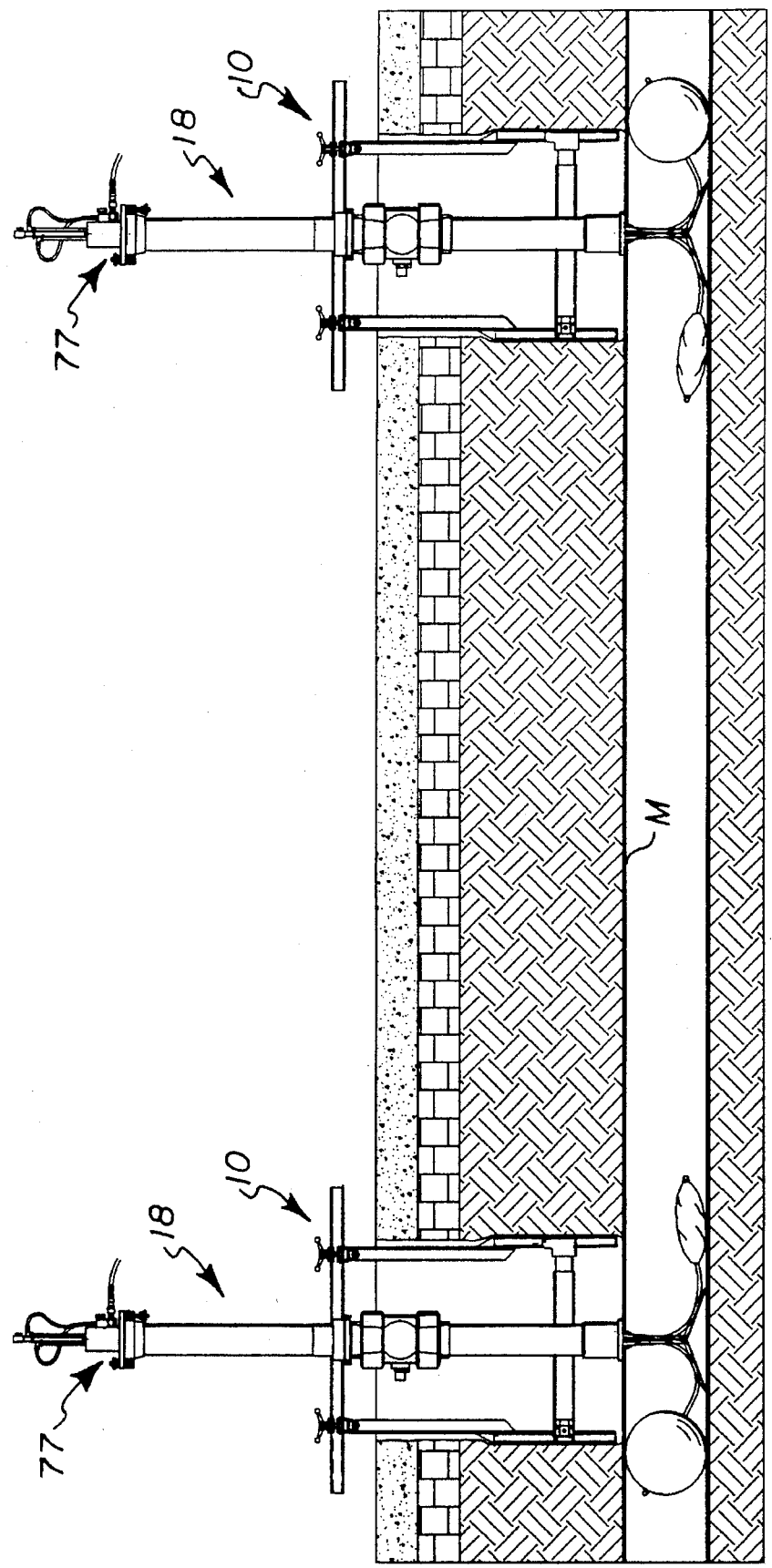
Figure 14:
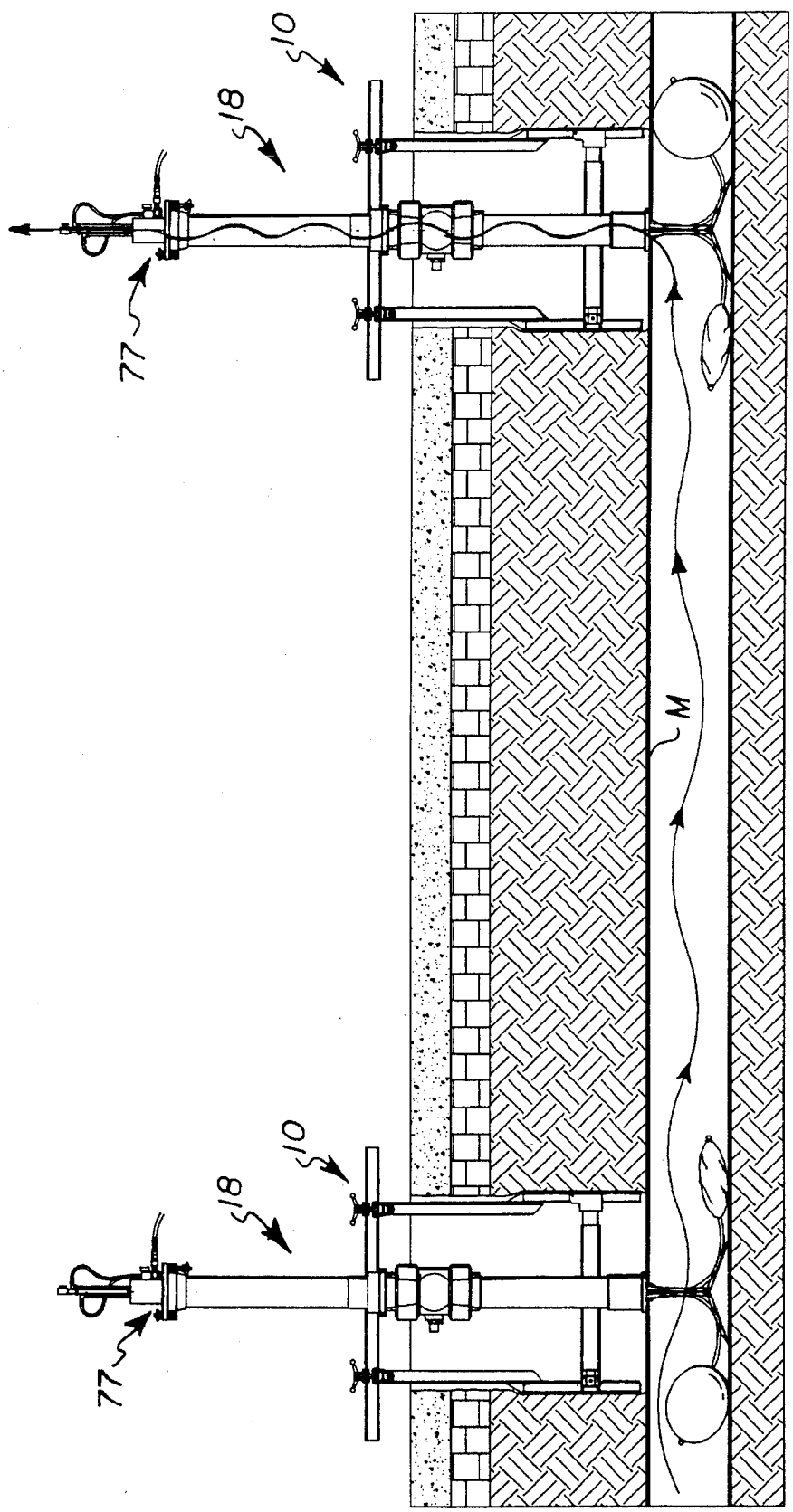

As shown schematically in FIGS. 12, 13, and 14, the present apparatus may be used in pairs to allow the pipe main M to be purged before it is restored to service. FIG. 12 shows two shut-off installations each having both bladders inflated. To purge the pipe main between the two shut-off installations, the inwardly facing bladders are deflated (FIG. 13), then one of the outer bladders of the upstream installation is slowly and partially deflated (FIG. 14). This allows gas to flow down to the other installation. The gas and air mixture is vented through the seal tube bladder deployment tool 77 of the second installation. After purging the pipe main, all the bladders can be completely collapsed and removed. The pipe main can then be restored to service.

At the conclusion of a job, the bladders are deflated and then pulled back into their respective compartments in the bladder deployment tool 77 by pulling upwardly on the tubes 96 and 97, and the bladder deployment tool is removed from the seal tube 18.

Figure 16:
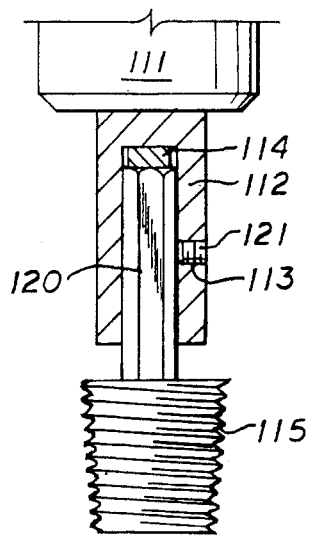
FIG. 16 is an enlarged cross section showing a thread die member connected to the lower end of the thread tapping and plugging tool.
Figure 17:
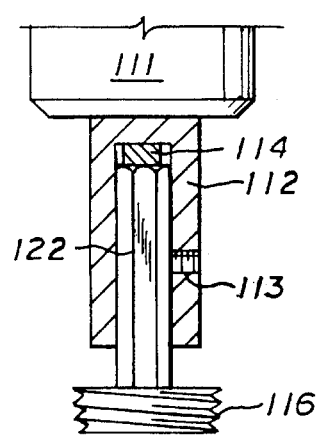
FIG. 17 is an enlarged cross section showing a threaded plug member connected to the lower end of the thread tapping and plugging tool.
Figure 15:
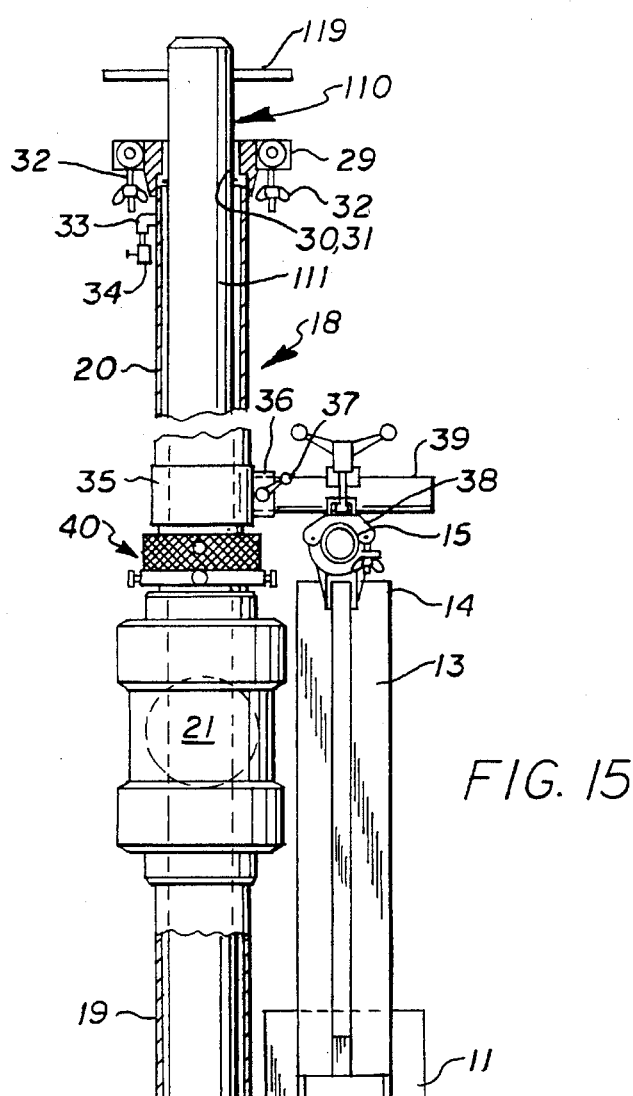
FIG. 15 is a cross section through the seal tube assembly showing a thread tapping and plugging tool therein.

As shown schematically in FIGS. 15, 16, and 17, a thread tapping and plugging tool 110 is used to thread the hole H which was formed in the side wall of the pipe main M and to place a pipe plug into the threaded hole. The thread tapping and plugging tool 110 is an elongate tubular member 111 enclosed at each end. A socket member 112 having a hexagonal cavity is secured to the bottom end of the drive tube 111 and has a threaded hole 113 extending laterally through its side wall. A magnet 114 is secured to the interior of the cavity. The socket 112 selectively receives a thread forming die member 115 or a threaded plug member 116. The drive tube 111 extends through the seal 31 and bearings 30 and 23 of the seal tube 18 and has a handle 119 connected to its top end.

A thread forming die 115 (FIG. 16) has a hexagonal stem 120 at its top end which is slidably received in the socket 112 at the bottom end of the drive tube 111 and secured thereto by a set screw 121 threadedly engaged in the threaded hole 113 in the side wall of the socket. The thread tapping and plugging tool 110 is lowered through the seal tube to place the thread forming die 115 onto the hole H which was previously cut in the side wall of the pipe main M and is rotated manually to form internal threads in the hole. After the threads have been formed, the tool 110 is rotated in the opposite direction to back the thread die 115 out of the hole and the tool 110 is removed from the seal tube 18.

An externally threaded plug 116 (FIG. 16) having a hexagonal stem 122 at its top end is then slidably installed in the socket 112 at the bottom end of the drive tube 111 and releasably attached thereto by the magnet 114 in the socket. The 110 is lowered through the seal tube 18 to place the threaded plug 116 into the hole H which was previously threaded and is rotated manually to threadedly engage the plug in the threaded hole. After the plug 115 has been secured, the drive tube 111 is lifted to disengage the magnet 114 in the socket 112 from plug 116 and the tool 110 is removed from the seal tube 18. It should be understood, that the plug may be provided with conventional pipe thread seal means such as pipe dope or seals. It should also be understood that the thread tapping and plugging tool may be powered by a rotary motor rather than a handle.

This procedure leaves the pipe main ready for immediate use once the stop-off has been completed. Other remedial work is not necessary. After the pipe plug is in place, the seal tube assembly is removed from the pipe main and the anchor system is removed from the excavation, and the excavation is then filled with soil.

While this invention has been described fully and completely with special emphasis upon a preferred embodiment, it should be understood that within the scope of the appended claims the invention may be practiced otherwise than as specifically described herein.

We claim:

1. A method for stopping the flow of fluid in a pipe main buried in soil while repairs are being made to the main comprising the steps of;

excavating said soil to a depth to expose only a portion of said pipe main exterior surface of sufficient area to receive the lower end of a hollow tubular member, installing a support member horizontally across the excavation above said pipe main and anchoring opposite ends of said support member to opposed sides of the excavation, placing the lower end of a hollow tubular member against the exposed exterior surface of said pipe main to extend radially therefrom, releasably connecting the radially extending upper portion of said hollow tubular member to said anchored support member to extend longitudinally between said pipe main and said anchored support member and to move relative thereto in the longitudinal direction, applying a force along the longitudinal axis of said hollow tubular means against said anchored support member to force the lower end of said hollow tubular member downward relative thereto and compress the lower end of said elongate hollow tubular member against the exposed exterior surface of said pipe main to effect a fluid sealing relation therebetween, inserting a cutting tool through said hollow tubular member and cutting a hole through the exposed exterior surface of said pipe main and thereafter removing said cutting tool and the cut material, inserting a bladder deployment tool through said hollow tubular member, said deployment tool containing at least one retractable inflatable bladder in a deflated condition connected with a source of fluid under pressure, deploying said at least one bladder into the interior of said pipe main and applying fluid under pressure to said at least one bladder to inflate said at least one bladder to expand and engage the interior surface of said pipe main in a fluid sealing relation to prevent fluid in said pipe main from leaking past said at least one inflated bladder while repairs are being made to said pipe main, after repairs have been made to said pipe main, deflating said at least one bladder and retracting it inside said bladder deployment tool and then removing said bladder deployment tool, and thereafter disconnecting said hollow tubular member from said anchored support member and removing said hollow tubular member from the exposed exterior surface of said pipe main.

2. The method according to claim 1 including the steps of after removing said cutting tool and prior to inserting said bladder deployment tool through said hollow tubular member, inserting a spray nozzle through said hollow tubular member and into the interior of said pipe main, said nozzle connected with a source of viscous sealant under pressure, spraying the interior surface of said pipe main to apply a coating of the viscous sealant to the interior surface, and then inserting said bladder deployment tool through said hollow tubular member and deploying said at least one bladder into the interior of said pipe main and applying fluid under pressure to said at least one bladder to inflate said at least one bladder to expand and engage the coated interior surface of said pipe main in a fluid sealing relation such that said viscous sealant fills the voids and imperfections in the interior surface to prevent fluid in said pipe main from leaking past said at least one inflated bladder while repairs are being made to said pipe main, after repairs have been made to said pipe main, deflating said at least one bladder and retracting it inside said bladder deployment tool and then removing said bladder deployment tool, and thereafter disconnecting said hollow tubular member from said anchored support member and removing said hollow tubular member from the exposed interior surface of said pipe main.

3. The method according to claim 1 including the steps of after deflating said at least one bladder and retracting it inside said bladder deployment tool and removing said bladder deployment tool, and prior to removing said hollow tubular member;

inserting a plug installation tool through said hollow tubular member, said plug installation tool carrying a plug seal element, engaging said plug seal element in said hole cut through the exposed exterior surface of said pipe main, and then removing said plug installation tool, and thereafter disconnecting said hollow tubular member from said anchored support member and removing said hollow tubular member from the exposed interior surface of said pipe main.

4. The method according to claim 1 including the steps of after deflating said at least one bladder and retracting it inside said bladder deployment tool and removing said bladder deployment tool, and prior to removing said hollow tubular member;

inserting a thread tapping die through said hollow tubular member and forming threads in the hole which was cut through the exposed surface of said pipe main and thereafter removing said thread tapping tool, inserting a plug installation tool through said hollow tubular member, said plug installation tool carrying a threaded plug, threadedly engaging said threaded plug in said threaded hole and then removing said plug installation tool, and thereafter disconnecting said hollow tubular member from said anchored support member and removing said hollow tubular member from the exposed exterior surface of said pipe main.

5. The method according to claim 1 in which said step of compressing the lower end of an elongate hollow tubular member against the exposed exterior surface of said pipe main to form a sealing relation therebetween includes the step of installing a compliant seal at the bottom end of said hollow tubular member prior to compressing the lower end against the exposed exterior surface of said pipe main.

6. The method according to claim 1 including the step of prior to placing the lower end of said hollow tubular member against the exterior surface of said pipe main, cleaning the exposed exterior surface of said pipe main, and then placing the lower end of said hollow tubular member against the cleaned exterior surface of said pipe main to extend radially therefrom, and thereafter completing the recited steps.

7. The method according to claim 1 in which said step of anchoring opposite ends of said support member to opposed sides of the excavation comprises:

installing shoring means having a pair of opposed soil engaging members in the excavation and firmly engaging said soil engaging members against opposite walls of the excavation, and securing opposite ends of said support member to said soil engaging members.

8. The method according to claim 1 in which said step of anchoring opposite ends of said support member to opposed sides of the excavation comprises;

installing shoring means having a pair of opposed parallel spaced soil engaging members connected to opposite ends of an extendible and contractible actuator member in the excavation, extending said actuator member to firmly engage said soil engaging members against opposite walls of the excavation, and securing opposite ends of said support member to said soil engaging members.

9. The method according to claim 1 in which said step of anchoring opposite ends of said support member to opposed sides of the excavation comprises;

installing said support member horizontally across the top of the excavation and securing opposite ends of said support member to the ground surface on opposite sides of the excavation.

10. The method according to claim 1 in which said deployment tool contains a pair of retractable inflatable bladders in a deflated condition connected with a source of fluid under pressure, and said step of deploying said at least one bladder into the interior of said pipe main comprises first deploying one of said pair of bladders in a downstream direction inside said pipe main and then deploying the other one of said pair of bladders in an upstream direction inside said pipe main, applying fluid under pressure to each of said pair of bladders to inflate both said bladders to expand and engage the interior surface of said pipe main in a fluid sealing relation, and said hollow tubular member serving as a vent pipe to vent any fluid present between said inflated bladders, after repairs have been made to said pipe main, deflating each said bladder and retracting it inside said bladder deployment tool and then removing said bladder deployment tool, and thereafter disconnecting said hollow tubular member from said anchored support member and removing said hollow tubular member from the exposed interior surface of said pipe main.

11. The method according to claim 10 including the steps of after deploying said pair of bladders in a downstream and upstream direction into the interior of said pipe main and inflating both of said pair of bladders to expand and engage the interior surface of said pipe main in a fluid sealing relation, placing the lower end of a second hollow tubular member against the exterior surface of the pipe main to extend radially therefrom at a longitudinally spaced location from the first stated hollow tubular member, inserting a second bladder deployment tool through said second hollow tubular member, said second deployment tool containing a second pair of retractable inflatable bladders in a deflated condition connected with a source of fluid under pressure, deploying one of said second pair of bladders in a downstream direction inside said pipe main and then deploying the other one of said second pair of bladders in an upstream direction inside said pipe main, applying fluid under pressure to each of said second pair of bladders to inflate both of said second pair of bladders to expand and engage the interior surface of said pipe main in a fluid sealing relation, and deflating the inward facing ones of said first recited pair and said second pair of bladders, and then slowing partially deflating the upstream facing bladder of said first recited pair of bladders and allowing fluid to flow through said pipe main past the deflated bladders to the remaining downstream facing inflated bladder of said second pair of bladders, said second hollow tubular member serving as a vent pipe to vent any fluid leaking past said deflated bladders, whereby said pipe main is purged of fluid between said first recited hollow tubular member and said second hollow tubular member, and after purging said pipe main, completely deflating each said first recited and said second pairs of bladders and retracting them inside their respective said bladder deployment tool and then removing both said bladder deployment tools, and thereafter disconnecting said hollow tubular member from said anchored support member and removing said first recited and said second hollow tubular members from the exposed exterior surface of said pipe main.

12. Apparatus for removable installation on a pipe main disposed at the bottom of an excavation with only a portion of its exterior surface exposed for forming a hole in the side wall of the pipe main and stopping the flow of fluid in the pipe main comprising:

an elongate support member having opposite ends secured to the ground surface on opposed sides of the excavation to extend generally horizontally therebetween above said pipe main;

an elongate hollow tubular member having a bottom end contoured to fit the exposed portion of the exterior surface of said pipe main, a longitudinal upper portion extending radially from said pipe main, mounting means at an upper end for mounting various tools thereon, and having an interior diameter through which tools are passed to form a hole in the side wall of the pipe main and removably install seal means to shut off fluid flow in said pipe main;

said bottom end of said hollow tubular member supported on the exposed surface of said pipe main without the use of fastening means encircling said pipe main;

connector means connected between said support member and said hollow tubular member for supporting said hollow tubular member on the exposed surface of said pipe main in the radially extending position; and compressing means operatively connected between said hollow tubular member and said support member to apply a force along the longitudinal axis of said hollow tubular member against said support member to force said bottom end of said hollow tubular member downward relative thereto and compress said bottom end against the exposed exterior surface of said pipe main to effect a fluid sealing relation therebetween.

13. The apparatus according to claim 12 including shoring members at opposite ends of said elongate support member, said shoring members adapted to be firmly engaged on opposed sides of the excavation in a generally vertical position, and said elongate support member is supported at opposite ends by said shoring members to extend generally horizontally therebetween above said pipe main.

14. The apparatus according to claim 13 including an extendible and contractible actuator means extending between said shoring members, and adapted, when extended to firmly engage said shoring members against opposed sides of the excavation.

15. The apparatus according to claim 12 in which said compressing means comprises a vertically extendible and contractible jack device having a lower end connected to said hollow tubular member and an upper end connected with said support member, and adapted when extended, to apply a force along the longitudinal axis of said hollow tubular member against said support member to force said bottom end of said hollow tubular member downward relative thereto and compress said bottom end against the exposed exterior surface of said pipe main to effect a fluid sealing relation therebetween.

16. The apparatus according to claim 12 in which said connector means is an adjustable connector member movably mounted on said support member and connected with said hollow tubular member for supporting said hollow tubular member on said pipe main in selective radially extending positions relative to the longitudinal axis of said pipe main.

17. The apparatus according to claim 12 including compressible seal means in the bottom end of said hollow tubular member surrounding its interior diameter to form a fluid tight seal between said bottom end and the exterior surface of said pipe main when said bottom end is compressed against the exposed exterior surface of said pipe main.

18. The apparatus according to claim 17 in which said compressible seal means is a ring formed of compliant material having a circular wire cloth reinforcing element embedded therein.

19. The apparatus according to claim 12 including valve means on said hollow tubular member for closing off fluid flow through said interior diameter in a closed position and in an open position allowing tools to be passed therethrough.

20. The apparatus according to claim 12 including seal means in the upper end of said hollow tubular member surrounding its interior diameter to form a fluid tight seal against the exterior of tools which are received in the interior diameter of said hollow tubular member.

21. The apparatus according to claim 20 including vent means in the upper end of said hollow tubular member beneath said seal means for controlled venting of the interior diameter of said hollow tubular member to the atmosphere.

22. The apparatus according to claim 12 including a cutting tool slidably and rotatably received in said hollow tubular member and releasably connected at an upper end to said mounting means and having a hole cutting member at a lower end, rotary drive means connected to said cutting tool for rotating said hole cutting member, longitudinal feed means connected between said hollow tubular member and said cutting tool to extend and retract said cutting tool and said hole cutting member relative to said pipe main exterior surface, and said cutting tool being extended while said rotary drive means is rotating said hole cutting member to cut a hole through said pipe main.

23. The apparatus according to claim 22 including means connected with said hole cutting member for capturing the cut away material when cutting the hole through said pipe main and carrying it away when said cutting tool and said hole cutting member are retracted.

24. The apparatus according to claim 22 in which said hole cutting member comprises a circular hole saw having a pilot bit.

25. The apparatus according to claim 22 including a sealant application tool slidably and rotatably received in said hollow tubular member and releasably connected to an upper end to said mounting means and having a spray nozzle at a lower end, said sealant application tool and said spray nozzle connected to a source of pressurized viscous liquid sealant, and longitudinal feed means connected between said hollow tubular member and said sealant application tool to extend and retract said nozzle through the hole cut in said pipe main and said sealant application tool being rotated to spray viscous liquid sealant material onto the interior surface of said pipe main.

said viscous liquid sealant forming a viscous coating thereon which will fill the voids and imperfections in the interior surface when subsequently subjected to the radial pressure of a bladder inflated to expand inside said pipe main against the coated interior surface to prevent fluid in said pipe main from leaking past the inflated bladder while repairs are being made to said pipe main.

26. The apparatus according to claim 22 including a bladder deployment tool slidably received in said hollow tubular member and having a lower end received through the hole cut in said pipe main, at least one inflatable bladder slidably contained in said bladder deployment tool lower end in a deflated condition, control means connected with said at least one bladder for selectively connecting said at least one bladder to a source of fluid under pressure and a source of vacuum to effect inflation and deflation thereof, extension and retraction means connected with said at least one bladder for extending and retracting said at least one bladder longitudinally relative to said bladder deployment tool, positioning means at said deployment tool lower end to direct said at least one bladder in a deflated condition outwardly of said lower end and into the interior of said pipe main along its longitudinal axis, said control means being selectively operated to apply fluid under pressure to said at least one bladder to inflate said bladder to expand and engage the interior surface of said pipe main in a fluid sealing relation, and to apply vacuum to said bladder to deflate same, and said extension and retraction means being operated to retract said at least one bladder in a deflated condition inside said bladder deployment tool lower end.

27. The apparatus according to claim 26 including vent means in the upper end of said bladder deployment tool for controlled venting of the interior of said pipe main and the interior of said bladder deployment tool to the atmosphere before and after deployment and inflation of said at least one bladder.

28. The apparatus according to claim 26 in which there are a pair of inflatable bladders slidably contained in said bladder deployment tool lower end in a deflated condition, said control means is connected with each one of said pair of bladders for selectively connecting each one of said pair of bladders to a source of fluid under pressure and a source of vacuum to effect independent inflation and deflation thereof, said extension and retraction means is connected with each one of said pair of bladders for independently extending and retracting each one of said pair of bladders longitudinally relative to said bladder deployment tool, positioning means at said deployment tool lower end to direct each one of said pair of bladders in a deflated condition outwardly of said lower end and into the interior of said pipe main along its longitudinal axis in opposite direction, said control means being selectively operated to apply fluid under pressure to each one of said pair of bladders to independently inflate said bladders to expand and engage the interior surface of said pipe main in a fluid sealing relation, and to apply vacuum each one of said pair of bladders to independently deflate same, and said extension and retraction means being operated to independently retract each one of said pair of bladders in a deflated condition inside said bladder deployment tool lower end.

29. The apparatus according to claim 22 including a plug installation tool slidably received in said hollow tubular member and having a sealing plug element releasably connected at a lower end, said plug installation tool being lowered relative to said hollow tubular member to sealingly engage said sealing plug element the hole in said pipe main and after being engaged, said plug installation tool being disconnected and raised from said sealing plug element.

30. The apparatus according to claim 22 including a thread tapping tool slidably and rotatably received in said hollow tubular member and having a thread forming die at a lower end, said thread tapping tool being lowered and rotated relative to said hollow tubular member to rotatably engage the hole cut in said pipe main to form internal threads therein and thereafter being rotated in an opposite direction and raised to remove said thread forming die from the threaded hole in said pipe main.

31. The apparatus according to claim 30 including rotary drive means connected with said thread tapping tool for rotating said thread forming die.

32. The apparatus according to claim 30 including a plug installation tool slidably and rotatably received in said hollow tubular member and having an externally threaded plug releasably connected at a lower end, said plug installation tool being lowered and rotated relative to said hollow tubular member to threadedly engage said threaded plug in the threaded hole in said pipe main and after being threadedly engaged, said plug installation tool being disconnected and raised from said threaded plug.

33. The apparatus according to claim 32 including rotary drive means connected with said plug installation tool rotating same.

34. The apparatus according to claim 32 in which said thread tapping tool and said plugging tool comprise an elongate tubular member slidably and rotatably received in said hollow tubular member and releasably connected at an upper end to said mounting means and adapted at its bottom for selective connection of said thread forming member and said externally threaded plug.

* * * * *